United States Patent [19]
Kleinberg et al.

[11] Patent Number: 5,790,306
[45] Date of Patent: Aug. 4, 1998

[54] MICROSCOPE BEAMSPLITTER

[75] Inventors: James K. Kleinberg, Chesterfield; Nicholas E. John, St. Louis, both of Mo.

[73] Assignee: Global Surgical Corporation, St. Louis, Mo.

[21] Appl. No.: 790,054

[22] Filed: Jan. 28, 1997

Related U.S. Application Data

[63] Continuation of Ser. No. 491,369, Jun. 16, 1995, abandoned.

[51] Int. Cl.$^6$ .................... G02B 21/00; G02B 27/14
[52] U.S. Cl. .................... 359/368; 359/629; 359/638
[58] Field of Search .................... 359/368, 369, 359/370, 371, 372, 375, 627, 629, 634, 636, 638, 833, 386, 628

[56] References Cited

U.S. PATENT DOCUMENTS

| | | | |
|---|---|---|---|
| 587,443 | 8/1897 | Konig et al. | |
| 1,509,936 | 9/1924 | Douglass | |
| 1,603,331 | 10/1926 | Downey, Jr. | |
| 1,662,693 | 3/1928 | Astafiev | |
| 2,189,298 | 2/1940 | Rantsch | 88/1 |
| 2,246,817 | 6/1941 | Sauer | 88/23 |
| 2,655,077 | 10/1953 | Bennett | 88/39 |
| 2,687,670 | 8/1954 | Locquin | 88/39 |
| 3,511,556 | 5/1970 | Ammann | 350/157 |
| 3,646,608 | 2/1972 | Rowland | 350/87 |
| 3,658,405 | 4/1972 | Pluta | 359/371 |
| 3,668,406 | 6/1972 | Reid et al. | 250/220 |
| 4,040,726 | 8/1977 | Paca | 350/288 |
| 4,081,807 | 3/1978 | Urano et al. | 354/152 |
| 4,198,123 | 4/1980 | Kremen | 350/157 |
| 4,237,492 | 12/1980 | Roth et al. | 358/225 |
| 4,283,115 | 8/1981 | Fraissl | 350/171 |
| 4,406,520 | 9/1983 | Sato | 350/173 |
| 4,492,436 | 1/1985 | Bergmann | 350/395 |
| 4,627,688 | 12/1986 | Kobayashi et al. | 350/173 |
| 4,641,926 | 2/1987 | Shirasaki | 350/394 |
| 4,844,584 | 7/1989 | Miyagawa | 350/166 |
| 5,011,265 | 4/1991 | Tamamura et al. | 350/173 |
| 5,042,930 | 8/1991 | Hutt | 359/375 |
| 5,155,623 | 10/1992 | Miller et al. | 359/495 |
| 5,243,465 | 9/1993 | Fein | 359/636 |

FOREIGN PATENT DOCUMENTS

| | | |
|---|---|---|
| 873654 | 7/1942 | France |
| 715600 | 1/1942 | Germany |
| 47-26357 | 7/1972 | Japan |
| 4-60603 | 2/1992 | Japan |
| 862732 | 3/1961 | United Kingdom |
| 90/14609 | 11/1990 | WIPO |

*Primary Examiner*—Ricky D. Shafer
*Attorney, Agent, or Firm*—Howell & Haferkamp, L.C.

[57] ABSTRACT

A zonal beamsplitter for use with surgical microscopes including a pair of right triangular prisms positioned adjacent to each other in opposing relation along substantially planar surfaces defining their respective hypotenuses. The planar surface of one prism is bi-zonal and includes a first zone for diverting substantially all of a portion of an image-quality optical signal at an angle from the direction of travel of the optical signal, and a second zone for conducting substantially all of the remaining image-quality optical signal therethrough. The plane of the first zone may be offset from that of the second zone and/or coated with an opaque reflective surface such as a metal foil.

9 Claims, 2 Drawing Sheets

MICROSCOPE BEAMSPLITTER

This is a continuation of application Ser. No. 08/491,369 filed on Jun. 16, 1995, now abandoned.

FIELD OF THE INVENTION

This invention relates to a beamsplitter for splitting optical signals in a microscope, and in particular a surgical microscope.

BACKGROUND AND SUMMARY OF THE INVENTION

Beamsplitters are currently used in microscopes to split an optical signal so that the same image can be simultaneously delivered to the eye piece of the microscope, and to some accessory, such as an observer eye piece, or a camera. The beamsplitters that have been used in microscopes typically comprise two right-triangular prisms joined together along their respective hypotenuses to form a cube. A partially reflective film is impregnated between the prisms. The reflective film reflects a portion of the optical signal delivered to the beamsplitter 90° from the direction of the incident signal, and transmits a portion of the optical signal delivered to beamsplitter. These beamsplitters have several disadvantages when used in microscopes. First, the beamsplitter tends to polarize the optical signals. Second, the beamsplitter tends to alter the color of the optical signals. This is a serious disadvantage in applications where the color is important, such as in surgical microscopes, where a surgeon may rely on color of the structures being viewed for proper identification and diagnosis. Finally, these beamsplitters split the entire optical signal, providing two optical signals each having an area equal to that of the optical signal delivered to the beamsplitter but having diminished intensity. In many applications, a significant portion of the reflected signal is wasted. For example where the reflected signal is diverted to a miniature video camera, the portion of the reflected signal larger than the camera lens aperture is simply wasted, and the intensity of the transmitted signal needlessly attenuated.

The microscope beamsplitter of the present invention eliminates the problems associated with existing microscope beamsplitters. The beamsplitter of the present invention reflects completely a portion of the area of an incident optical signal. The area of the reflected signal can be adjusted for the particular application so that there is no wasted signal. The optical signal in the remaining area of the incident signal is transmitted without alteration. Thus, there is no polarization or color change to the transmitted signal. Moreover, the attenuation of the intensity of the transmitted signal is significantly reduced. Similarly, because the reflected signal is completely reflected, there is virtually no change in the polarization or color of the reflected signal. Moreover, the reflected signal, although small in area, is at nearly the same intensity as the incident signal.

These and other features and advantages will be in part apparent, and in part pointed out hereinafter.

BRIEF DESCRIPTION OF THE DRAWINGS

Corresponding reference numerals indicate corresponding parts throughout the several views of the drawings.

DETAILED DESCRIPTION OF THE PREFERRED EMBODIMENT

Figure 1:
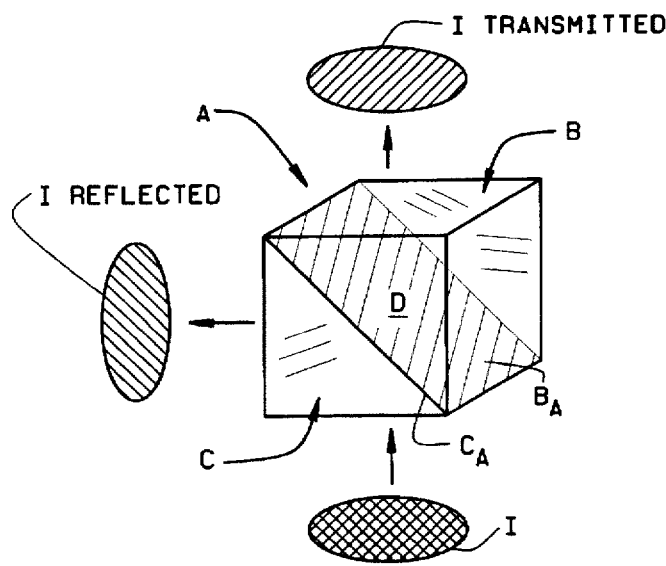
FIG. 1 is a front perspective view of a prior art microscope beamsplitter.

A prior art microscope beamsplitter is indicated generally as A in FIG. 1. The beamsplitter A comprises two right triangular prisms B and C, joined along their respective surface $B_h$, $C_h$ defining a hypotenuse to form a cube. A reflective film D is impregnated between the surfaces $B_h$, $C_h$ of prisms B and C, respectively. The film D reflects a fraction $I_{reflected}$ of an incident optical signal I to the left, as shown in FIG. 1, and allows a fraction $I_{transmitted}$ of the incident optical signal I to be transmitted therethrough. The splitting of the incident optical signal I occurs substantially uniformly across the entire area of the optical signal I. In addition to causing the intensity of the transmitted and reflected signals to be significantly reduced from that of the incident optical signal, splitting the incident optical signal in this manner further tends to polarize the reflected and transmitted optical signals, and alters the color of these signals as well.

Figure 2:
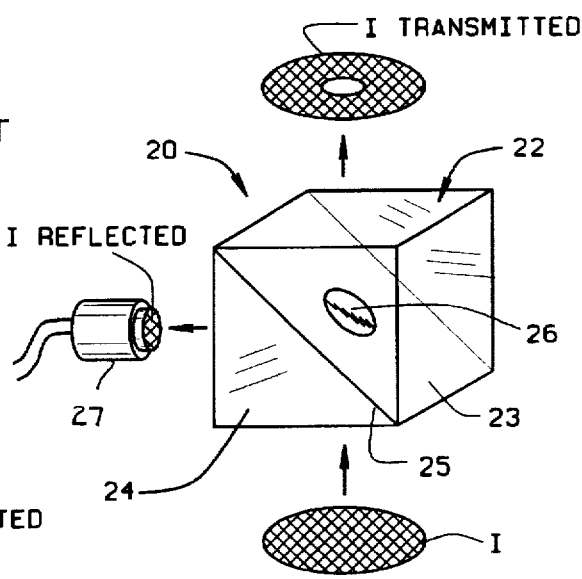
FIG. 2 is a front perspective view of a microscope beamsplitter constructed according to the principles of this invention.
Figure 2A:
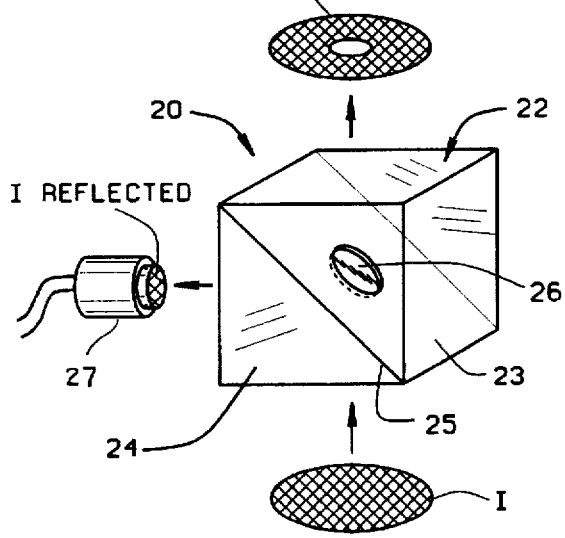
FIG. 2A is a front perspective view of an alternate embodiment of a beam splitter constructed according to the principles of this invention.
Figure 3:
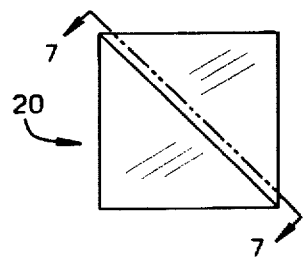
FIG. 3 is a front elevation view of the microscope beamsplitter.
Figure 4:
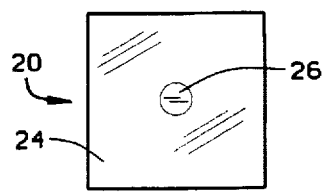
FIG. 4 is a side elevation view of the microscope beamsplitter.
Figure 5:
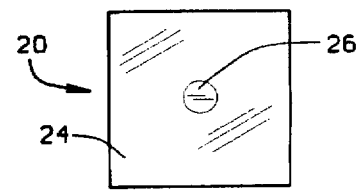
FIG. 5 is a bottom elevation view of the microscope beamsplitter.
Figure 6:
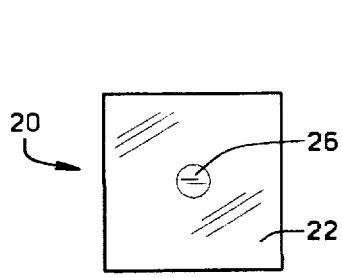
FIG. 6 is a top elevation view of the microscope beamsplitter.

A microscope beamsplitter constructed according to the principles of this invention is indicated generally as 20 in FIGS. 2–8. The beamsplitter 20 comprises two right triangular prisms 22 and 24, joined along their respective surfaces 23, 25 defining a hypotenuse to form a cube. A reflective element 26 is disposed or impregnated between the prisms 22 and 24, and reflects a fraction $I_{reflected}$ of an incident optical signal I to the left, as shown in FIG. 2. The remaining fraction $I_{transmitted}$ of the incident optical signal I passes through the prisms 22, 24. The reflective element 26 may be, for example, a highly reflective metal foil or a highly reflective metal coating deposited on one of the surfaces 23, 25 of a respective one of the prisms 22, 24. Alternatively, as shown in FIG. 2A, the reflective element 26 may include a planar surface parallel to, and spaced inwardly from, either surface 23 or 25, thereby creating a Total Internal Reflection (TIR) glass/air interface, i.e., an interface where the optical signal travels from a dense medium (glass) to a less dense medium (air), causing the optical signal to be completely reflected when the incident angle of the optical signal is greater than the TIR angle (as defined by the refractive index of the air and glass).

Figure 7:
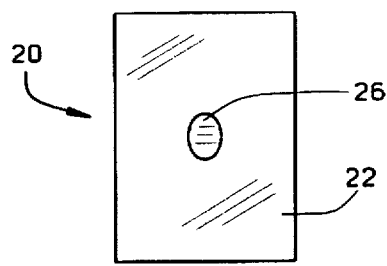
FIG. 7 is a cross sectional view of the microscope beamsplitter taken along the plane of line 7—7 in FIG. 3.

As shown in FIGS. 2 and 7, the reflective element 26 has an oval shape, so that the reflected signal $I_{reflected}$ has a circular shape. Of course the reflective element 26 could have some other shape, but a circular reflected signal is particularly desirable for delivery to an auxiliary eye piece or to a video camera 27. As shown in the figures, and in particular FIG. 8, the reflective element 26 only occludes a small portion $I_{reflected}$ of the light path through the beamsplitter 20, so that a substantial portion $I_{transmitted}$ of the incident signal I simply passes through the beamsplitter 20, unaffected by the reflective element 26. Only the portion $I_{reflected}$ of the incident signal I aligned with the area of the reflective portion 26 is affected, and this portion $I_{reflected}$ of the signal I is substantially completely reflected. This reflection has little or no affect on the color or polarization of the reflected light $I_{reflected}$ so that the reflected optical signal $I_{reflected}$ corresponds to that portion of the incident signal I.

Figure 8:
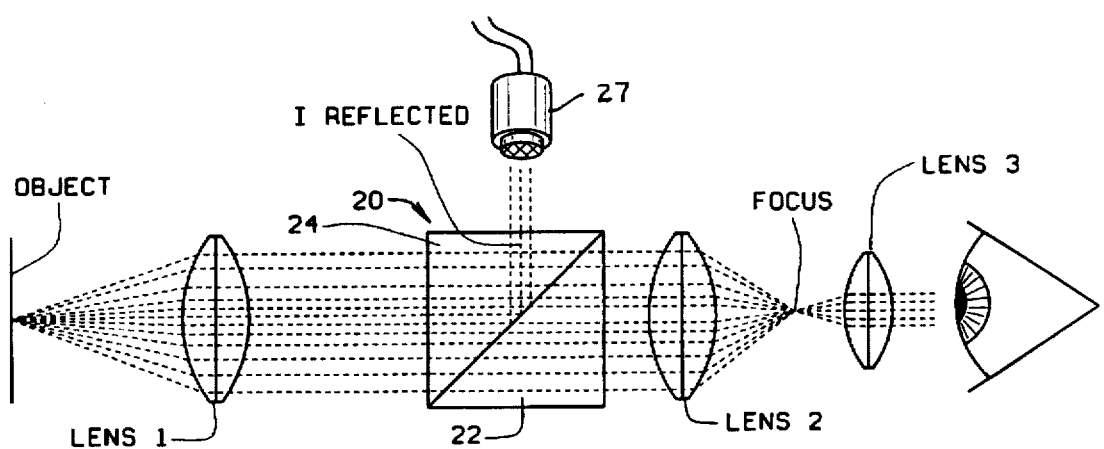
FIG. 8 is an enlarged side elevation view illustrating the paths of travel of portions of the incident optical beam as it travels from a light source, through the beamsplitter and to a viewer's eye.

As shown in FIG. 8, the beamsplitter 20 is positioned in the optical path of a microscope between lens 1 and lens 2, i.e., in the region where the optical signal is collimated at its greatest cross-sectional area so that the area of the reflected portion $I_{reflected}$ of the incident optical signal I is much smaller than that of the incident optical signal I, thereby permitting a large percentage of the incident optical signal I to pass unobstructedly thereby. In this way, the loss of the reflected portion $I_{reflected}$ of the incident signal I does not significantly adversely affect the overall optical signal $I_{transmitted}$ transmitted by the beamsplitter 20. Thus, apart from a slight diminution in the intensity of the optical signal I, a high quality optical signal $I_{transmitted}$ is delivered to the eye piece, lens 2. Moreover, the reflected signal $I_{reflected}$ has substantially the same intensity as the incident signal I, and because the size of the reflected signal $I_{reflected}$ can be adjusted to match the requirements of an auxiliary eye piece or camera, none of the optical signal I is wasted. OPERATION In operation, the beamsplitter 20 is tailored to a particular microscope application. The size and shape of the reflective portion 26 is adjusted for the particular application. For example, in a surgical microscope a typical beamsplitter is a 20 mm cube. The reflective portion might be an oval that reflects a circular signal with a 3/32 diameter, which is sufficient for current video cameras. As a general rule it is desirable that the reflective portion be less than about 25% of the area of the incident signal, and preferably between about 1% and about 10% of the incident signal.

In use, the optical signal I passes through the optical path of the microscope to the beamsplitter 20. The optical signal in the area aligned with the reflective element 26 is substantially completely reflected in a generally circular beam. The optical signal outside the area aligned with the reflective element 26 is substantially completely transmitted to the eye piece, lens 2.

Thus there has been shown and described means for constructing a novel beamsplitter for splitting optical signals for use with a microscope and, particularly, a surgical microscope. The present invention fulfills all the objectives and advantages set forth above. It will be apparent to those skilled in the art, however, that many changes, modifications, variations and other uses and applications for the subject invention are possible. All such changes, modifications, variations and other uses and applications which do not depart from the spirit and scope of the invention are deemed to be covered by the invention, which is limited only to the claims which follow.

What is claimed is:

1. A zonal beamsplitter for use in a surgical microscope comprising:
   a first prism having a substantially planar surface, and
   a second prism having a bi-zonal surface including a planar first zone for diverting substantially all of a portion of the area of an image-quality optical signal at an angle from the direction of travel of the optical signal, and a planar second zone positioned adjacent to the planar surface of the first prism in an opposing relationship for conducting substantially all of the remaining portion of the area of said image-quality optical signal therethrough wherein the area of the first zone is generally centered within the area of the second zone.

2. The device as described in claim 1 wherein the first zone includes an opaque reflective material.

3. The device as described in claim 1 wherein the first zone is not coplanar with the second zone.

4. The device as described in claim 1 wherein the perimeter of the area of the first zone is spaced inwardly of that of the second zone.

5. The device as described in claim 1 wherein the area of the first zone forms an oval.

6. The device as described in claim 1 wherein the first prism is a right triangular prism with the planar surface defining the hypotenuse of the first prism and the second prism is a right triangular prism with the second zone of the bi-zonal surface defining the hypotenuse of the second prism.

7. In a surgical microscope having an eye piece for viewing an optical signal and an optical signal path for delivering an optical signal to the eye piece, a zonal beamsplitter in the optical signal path for splitting the optical signal, the beam splitter comprising first and second prisms having abutting generally planar surfaces oriented at an angle with respect to the optical signal path, one of the surfaces having a reflective element that occludes a portion of the optical path and reflects a portion of the optical signal out of the optical signal path.

8. A surgical microscope having an eye piece for viewing an optical signal, an optical signal path for delivering an optical signal to the eye piece, and a zonal beamsplitter in the optical signal path for splitting the optical signal, the beam splitter comprising first and second prisms having abutting generally planar surfaces oriented at an angle with respect to the optical signal path, one of the surfaces having a reflective element that occludes a portion of the optical path and reflects a portion of the optical signal out of the optical signal path.

9. The surgical microscope according to claim 8 further comprising a camera having an optical signal receiver, and wherein the reflective element is sized and shaped to reflect a portion of the optical signal generally corresponding in size and shape to the optical signal receiver of the camera.

* * * * *